United States Patent
Mady et al.

(10) Patent No.: US 11,075,926 B2
(45) Date of Patent: Jul. 27, 2021

(54) CYBER SECURITY FRAMEWORK FOR INTERNET-CONNECTED EMBEDDED DEVICES

(71) Applicant: Carrier Corporation, Palm Beach Gardens, FL (US)

(72) Inventors: Alie El-Din Mady, Cork (IE); Deepak Mehta, West Hartford, CT (US); Younes Hamdaoui, Paris (FR); Devu Manikantan Shila, West Hartford, CT (US); Menouer Boubekeur, Cork (IE)

(73) Assignee: CARRIER CORPORATION, Palm Beach Gardens, FL (US)

(*) Notice: Subject to any disclaimer, the term of this patent is extended or adjusted under 35 U.S.C. 154(b) by 262 days.

(21) Appl. No.: 16/248,121

(22) Filed: Jan. 15, 2019

(65) Prior Publication Data
US 2019/0222590 A1 Jul. 18, 2019

Related U.S. Application Data

(60) Provisional application No. 62/617,371, filed on Jan. 15, 2018.

(51) Int. Cl.
*H04L 29/06* (2006.01)
*G06F 21/55* (2013.01)
(Continued)

(52) U.S. Cl.
CPC ........ *H04L 63/1416* (2013.01); *G06F 21/554* (2013.01); *H04L 63/1425* (2013.01);
(Continued)

(58) Field of Classification Search
CPC . H04L 63/1416; H04L 63/1441; H04L 67/12; H04L 63/1425; H04L 63/20;
(Continued)

(56) References Cited

U.S. PATENT DOCUMENTS 7,295,831 B2 * 11/2007 Coleman ................ H04B 7/086
                                                455/410
8,949,668 B2 *  2/2015 Hanks .................. H04L 63/1416
                                                714/26
(Continued)

FOREIGN PATENT DOCUMENTS

CN    102377814 B    5/2013
CN    103905450 B    5/2017
(Continued)

OTHER PUBLICATIONS

F. Macia-Perez et al., "Network Intrusion Detection System Embedded on a Smart Sensor", IEEE Transactions on Industrial Electronics, vol. 58, Issue 3, Mar. 2011, pp. 722-732.
(Continued)

*Primary Examiner* — Badri Narayanan Champakesan
(74) *Attorney, Agent, or Firm* — Cantor Colburn LLP (57) ABSTRACT

Methods, systems and computer program products for intrusion detection are provided. Aspects include receiving, by a processor, internet of things (IoT) device data from each of a plurality of IoT devices, wherein the IoT device data comprises operational data and non-operational data associated with each of the plurality of IoT devices. A security model is built for the plurality of IoT devices based at least in part on the IoT device data, wherein the security model comprises one or more IoT device data ranges. The plurality of IoT devices are monitored to identify a potential intrusion in any of the plurality of IoT devices based at least in part on the IoT device data exceeding any of the one or more IoT device data ranges.

14 Claims, 4 Drawing Sheets

(51) Int. Cl.
*H04L 29/08* (2006.01)
*H04W 4/70* (2018.01)
*H04W 12/121* (2021.01)

(52) U.S. Cl.
CPC .......... *H04L 63/1441* (2013.01); *H04L 63/20* (2013.01); *H04L 67/12* (2013.01); *H04W 4/70* (2018.02); *H04W 12/121* (2021.01); *H04L 67/10* (2013.01)

(58) Field of Classification Search
CPC .... H04L 67/10; H04W 12/1201; H04W 4/70; G06F 21/554
USPC .......................................................... 726/23
See application file for complete search history.

(56) References Cited

U.S. PATENT DOCUMENTS

| | | | | |
|---|---|---|---|---|
| 9,160,760 | B2* | 10/2015 | Vasseur | H04L 63/1425 |
| 9,268,938 | B1* | 2/2016 | Aguayo Gonzalez | G01R 31/2891 |
| 9,338,174 | B2* | 5/2016 | Locasto | H04L 63/0815 |
| 9,392,017 | B2* | 7/2016 | Cui | G06F 21/54 |
| 9,398,035 | B2* | 7/2016 | Vasseur | H04L 63/1441 |
| 9,756,062 | B2* | 9/2017 | Dekel | H04L 63/1425 |
| 10,230,740 | B2* | 3/2019 | Beatty | H04L 63/1441 |
| 2007/0289013 | A1* | 12/2007 | Lim | H04L 63/1425 726/22 |
| 2008/0120720 | A1* | 5/2008 | Guo | G06F 21/552 726/23 |
| 2013/0269032 | A1* | 10/2013 | Chasko | H04L 63/1491 726/23 |
| 2016/0028763 | A1* | 1/2016 | Cruz Mota | H04L 63/1458 726/23 |
| 2016/0261465 | A1* | 9/2016 | Gupta | H04W 12/121 |
| 2018/0357595 | A1* | 12/2018 | Rai | G06N 20/00 |
| 2019/0108330 | A1* | 4/2019 | Sikder | G06F 21/577 |
| 2019/0182278 | A1* | 6/2019 | Das | H04W 4/70 |
| 2019/0205774 | A1* | 7/2019 | Ba | G06Q 50/06 |

FOREIGN PATENT DOCUMENTS

| | | | |
|---|---|---|---|
| CN | 106855924 A | 6/2017 | |
| CN | 107291383 A | 10/2017 | |
| CN | 107360182 A | 11/2017 | |
| EP | 3092742 A1 * | 11/2016 | ......... H04L 63/1416 |
| WO | 0186468 A1 | 11/2001 | |
| WO | 15149663 A1 | 10/2015 | |
| WO | 2017175160 A1 | 10/2017 | |

OTHER PUBLICATIONS

H.H.W.J. Bosman, "Anomaly detection in networked embedded sensor systems", Eindhoven: Technische Universiteit Eindhoven, 2016, 156 pages.

M. Boubekeur et al., "Anomaly-Based Intrusion Detection System for Embedded Devices on Internet", United Technologies Research Center, 5 pages.

M. Heigl et al., "An Approach to an Embedded Anomaly-Based IDS on the Example of SOME/IP", Deggendorf Institute of Technology, Vector Testing Symposium, 2017, 20 pages.

Extended European Search Report; dated Feb. 20, 2019; European Application No. 19151683.0; Application Filed: Jan. 14, 2019; 8 pages.

* cited by examiner

CYBER SECURITY FRAMEWORK FOR INTERNET-CONNECTED EMBEDDED DEVICES

CROSS-REFERENCE TO RELATED APPLICATIONS

This application claims the benefit of U.S. application Ser. No. 62/617,371 filed Jan. 15, 2018, which is incorporated herein by reference in its entirety.

BACKGROUND

Exemplary embodiments pertain to the art of embedded devices and more specifically to a cyber security framework for internet-connected embedded devices.

Nowadays, everyday appliances include some form of embedded device that can be connected to a network, such as the internet. These embedded devices can assist with controlling the devices remotely. For example, a homeowner may wish to change the temperature at their home while they are away and can connect to an embedded device within a thermostat to adjust the home temperature. These embedded devices, typically, have very limited security protocols as they lack the resources to run advances security programs. The limited functionality of the embedded devices can make them vulnerable to attack.

BRIEF DESCRIPTION

According to one embodiment, a method is provided. The method includes receiving, by a processor, internet of things (IoT) device data from each of a plurality of IoT devices, wherein the IoT device data comprises operational data and non-operational data associated with each of the plurality of IoT devices. A security model is built for the plurality of IoT devices based at least in part on the IoT device data, wherein the security model comprises one or more IoT device data ranges. The plurality of IoT devices are monitored to identify a potential intrusion in any of the plurality of IoT devices based at least in part on the IoT device data exceeding any of the one or more IoT device data ranges.

In addition to one or more of the features described above, or as an alternative, further embodiments of the method may include identifying a first device in the plurality of devices where the potential intrusion occurred. One or more characteristics of the potential intrusion are analyzed to determine that the potential intrusion is an intrusion event and a security measure for the intrusion event is employed in the first device.

In addition to one or more of the features described above, or as an alternative, further embodiments of the method may include identifying a first device in the plurality of devices where the potential intrusion occurred. One or more characteristics of the potential intrusion are analyzed to determine that the potential intrusion is not an intrusion event. The security model is updated with the one or more characteristics of the potential intrusion.

In addition to one or more of the features described above, or as an alternative, further embodiments of the method may include that employing the security measure for the intrusion event comprises isolating the first IoT device from one or more other IoT devices in the plurality of IoT devices and reconfiguring the one or more IoT devices to account for the isolating the first device.

In addition to one or more of the features described above, or as an alternative, further embodiments of the method may include that evoking the security measure for the intrusion event comprises triggering a change to a configuration of the IoT device.

In addition to one or more of the features described above, or as an alternative, further embodiments of the method may include that the device data further comprises status data associated with the plurality of IoT devices and the monitoring the plurality of IoT devices to identify the potential intrusion comprises analyzing the status data for each of the plurality of IoT devices to determine one or more anomalies associated with a first IoT device. Additional IoT device data associated with the first IoT device is obtained. The additional IoT device data is analyzed to determine the potential intrusion.

In addition to one or more of the features described above, or as an alternative, further embodiments of the method may include that the determining that the potential intrusion is an intrusion event further comprises comparing the one or more characteristics of the potential intrusion to historical IoT device data associated with the plurality of IoT devices.

According to one embodiment, a system is provided. The system includes a processor communicatively coupled to a memory, the processor configured to perform a method comprising receiving, by a processor, interne of things (IoT) device data from each of a plurality of IoT devices, wherein the IoT device data comprises operational data and non-operational data associated with each of the plurality of IoT devices. A security model is built for the plurality of IoT devices based at least in part on the IoT device data, wherein the security model comprises one or more IoT device data ranges. The plurality of IoT devices are monitored to identify a potential intrusion in any of the plurality of IoT devices based at least in part on the IoT device data exceeding any of the one or more IoT device data ranges.

In addition to one or more of the features described above, or as an alternative, further embodiments of the system may include identifying a first device in the plurality of devices where the potential intrusion occurred. One or more characteristics of the potential intrusion are analyzed to determine that the potential intrusion is an intrusion event and a security measure for the intrusion event is employed in the first device.

In addition to one or more of the features described above, or as an alternative, further embodiments of the system may include identifying a first device in the plurality of devices where the potential intrusion occurred. One or more characteristics of the potential intrusion are analyzed to determine that the potential intrusion is not an intrusion event. The security model is updated with the one or more characteristics of the potential intrusion.

In addition to one or more of the features described above, or as an alternative, further embodiments of the system may include that employing the security measure for the intrusion event comprises isolating the first IoT device from one or more other IoT devices in the plurality of IoT devices and reconfiguring the one or more IoT devices to account for the isolating the first device.

In addition to one or more of the features described above, or as an alternative, further embodiments of the system may include that evoking the security measure for the intrusion event comprises triggering a change to a configuration of the IoT device.

In addition to one or more of the features described above, or as an alternative, further embodiments of the system may include that the device data further comprises status data associated with the plurality of IoT devices and the monitoring the plurality of IoT devices to identify the potential intrusion comprises analyzing the status data for each of the plurality of IoT devices to determine one or more anomalies associated with a first IoT device. Additional IoT device data associated with the first IoT device is obtained. The additional IoT device data is analyzed to determine the potential intrusion.

In addition to one or more of the features described above, or as an alternative, further embodiments of the system may include that the determining that the potential intrusion is an intrusion event further comprises comparing the one or more characteristics of the potential intrusion to historical IoT device data associated with the plurality of IoT devices.

According to one embodiment, a computer program product is provided. The computer program product includes a non-transitory computer readable storage medium having program instructions embodied therewith, the program instructions executable by a processor to cause the processor to perform a method comprising receiving, by a processor, internet of things (IoT) device data from each of a plurality of IoT devices, wherein the IoT device data comprises operational data and non-operational data associated with each of the plurality of IoT devices. A security model is built for the plurality of IoT devices based at least in part on the IoT device data, wherein the security model comprises one or more IoT device data ranges. The plurality of IoT devices are monitored to identify a potential intrusion in any of the plurality of IoT devices based at least in part on the IoT device data exceeding any of the one or more IoT device data ranges.

In addition to one or more of the features described above, or as an alternative, further embodiments of the computer program product may include identifying a first device in the plurality of devices where the potential intrusion occurred. One or more characteristics of the potential intrusion are analyzed to determine that the potential intrusion is an intrusion event and a security measure for the intrusion event is employed in the first device.

In addition to one or more of the features described above, or as an alternative, further embodiments of the computer program product may include identifying a first device in the plurality of devices where the potential intrusion occurred. One or more characteristics of the potential intrusion are analyzed to determine that the potential intrusion is not an intrusion event. The security model is updated with the one or more characteristics of the potential intrusion.

In addition to one or more of the features described above, or as an alternative, further embodiments of the computer program product may include that employing the security measure for the intrusion event comprises isolating the first IoT device from one or more other IoT devices in the plurality of IoT devices and reconfiguring the one or more IoT devices to account for the isolating the first device.

In addition to one or more of the features described above, or as an alternative, further embodiments of the computer program product may include that evoking the security measure for the intrusion event comprises triggering a change to a configuration of the IoT device.

In addition to one or more of the features described above, or as an alternative, further embodiments of the computer program product may include that the device data further comprises status data associated with the plurality of IoT devices and the monitoring the plurality of IoT devices to identify the potential intrusion comprises analyzing the status data for each of the plurality of IoT devices to determine one or more anomalies associated with a first IoT device. Additional IoT device data associated with the first IoT device is obtained. The additional IoT device data is analyzed to determine the potential intrusion.

In addition to one or more of the features described above, or as an alternative, further embodiments of the computer program product may include that the determining that the potential intrusion is an intrusion event further comprises comparing the one or more characteristics of the potential intrusion to historical IoT device data associated with the plurality of IoT devices.

BRIEF DESCRIPTION OF THE DRAWINGS

The following descriptions should not be considered limiting in any way. With reference to the accompanying drawings, like elements are numbered alike.

The diagrams depicted herein are illustrative. There can be many variations to the diagram or the operations described therein without departing from the spirit of the disclosure. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

A detailed description of one or more embodiments of the disclosed apparatus and method are presented herein by way of exemplification and not limitation with reference to the Figures.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

Figure 1:
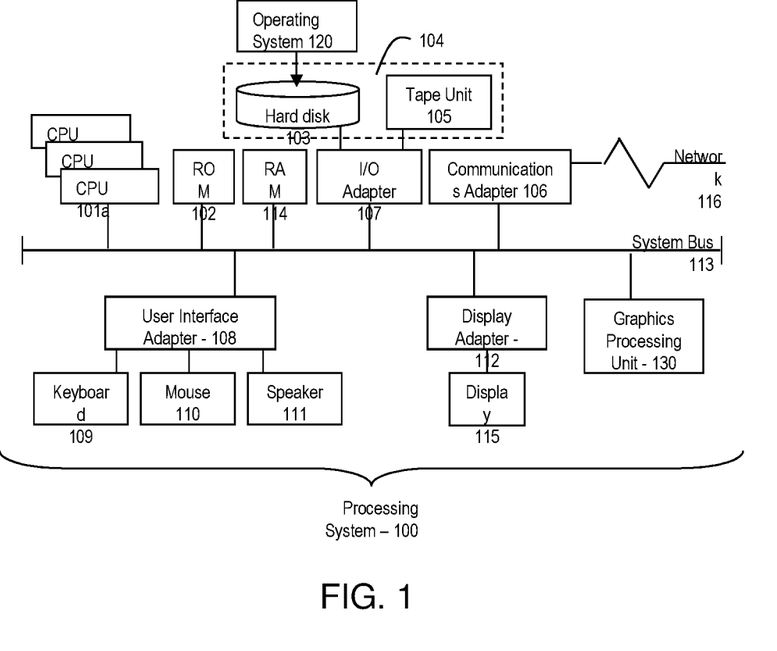
FIG. 1 depicts a block diagram of a computer system for use in implementing one or more embodiments.

Referring to FIG. 1, there is shown an embodiment of a processing system 100 for implementing the teachings herein. In this embodiment, the system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 1 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

In exemplary embodiments, the processing system 100 includes a graphics processing unit 130. Graphics processing unit 130 is a specialized electronic circuit designed to manipulate and alter memory to accelerate the creation of images in a frame buffer intended for output to a display. In general, graphics processing unit 130 is very efficient at manipulating computer graphics and image processing, and has a highly parallel structure that makes it more effective than general-purpose CPUs for algorithms where processing of large blocks of data is done in parallel.

Thus, as configured in FIG. 1, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system coordinate the functions of the various components shown in FIG. 1.

Turning now to an overview of technologies that are more specifically relevant to aspects of the disclosure, smart technology devices such as internet of things (IoT) objects have been incorporated in every day systems to connect otherwise electronically isolated objects or devices to either other IoT objects or to the internet. The term Internet of Things (IoT) object is used herein to refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other objects over a wired or wireless connection. An IoT object may have a passive communication interface, such as a quick response (QR) code, a radio-frequency identification (RFID) tag, an NFC tag, or the like, or an active communication interface, such as a modem, a transceiver, a transmitter-receiver, or the like. An IoT object can have a particular set of attributes (e.g., a device state or status, such as whether the IoT object is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet. For example, IoT objects may include, but are not limited to, refrigerators, toasters, ovens, microwaves, freezers, dishwashers, dishes, hand tools, clothes washers, clothes dryers, furnaces, heating, ventilation, air conditioning & refrigeration (HVACR) systems, air conditioners, thermostats, fire alarm & protection system, fire, smoke & CO detectors, access/video security system, elevator and escalator systems, burner and boiler controls, building management controls, televisions, light fixtures, vacuum cleaners, sprinklers, electricity meters, gas meters, etc., so long as the devices are equipped with an addressable communications interface for communicating with the IoT network. IoT objects may also include cell phones, desktop computers, laptop computers, tablet computers, personal digital assistants (PDAs), etc. Accordingly, the IoT network can include a combination of "legacy" Internet-accessible devices (e.g., laptop or desktop computers, cell phones, etc.) in addition to devices that do not typically have Internet-connectivity (e.g., dishwashers, etc.).

Embedded devices (e.g., IoT objects) connected to the Internet are continuously exploited by remote attack vectors. Typically the system vulnerabilities are due to insecure web interfaces, insufficient authentication and authorization, insufficient transport layer protection, broken cryptography, insecure software/firmware updates, or poor physical security. As opposed to PowerPC systems, embedded devices lack resources to run advanced attack detection. Moreover, embedded devices are often mass produced and share a static security footprint. Hence, a successful attack on a single device can be replicated across other devices with minimal effort. There exists a need towards developing a cyber security methodology that provides scalable and efficient intrusion detection and resilient architecture.

Turning now to an overview of the aspects of the disclosure, one or more embodiments address the above-described shortcomings of the prior art by providing a cyber security framework for internet-connected embedded devices. Particularly, aspects include a resilient cyber security framework that provides an Intrusion Detection System (IDS) and resilient policy identification methods. IDS uses a hierarchical intrusion detection mechanism consisting of two levels: local IDS and supervisory IDS. Local IDS is developed in an offline phase for a given embedded device which uses various information such as processing time, memory usage, and environmental data to learn and build a statistical model. The resulting statistical model is used to detect anomalous behavior at the level of device layer and reported to the supervisory IDS for decision making. The supervisory IDS, deployed at the gateway, learns and builds a superior detection model that captures the correlation between the connected devices during the deployment phase. Supervisory IDS uses the variation in the correlations among the devices behavior to infer the intrusion and confirm it if reported by local IDS. In order to prevent supervisory IDS from detecting attacks, an attacker has to learn the how a group of devices are correlated and then tamper with them accordingly, which is a complex task. In the event of an attack, supervisory IDS will apply a resilient policy to thwart attacks on other similar devices by triggering a change in the configuration of the devices and isolate the attacked devices and continue to provide the same services via use of virtual sensors.

Figure 2:
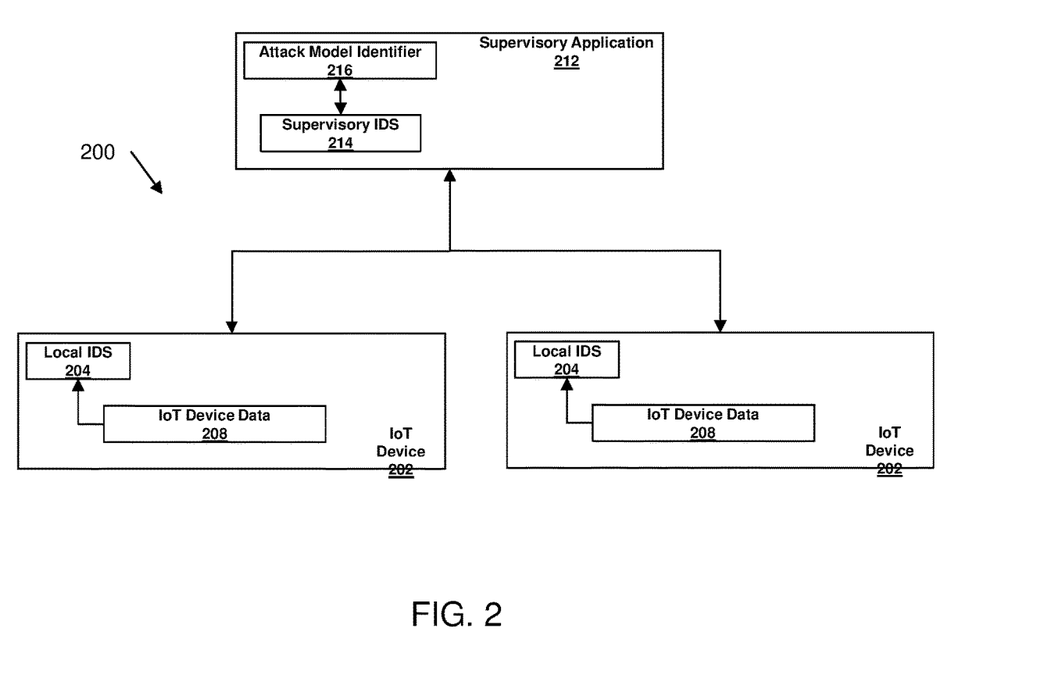
FIG. 2 depicts a diagram of a system for intrusion detection according to embodiments.

Turning now to a more detailed description of aspects of the present, FIG. 2 depicts a diagram of a system for intrusion detection according to embodiments. The system 200 includes IoT devices 202 with a supervisory application 212. Each of the IoT device 202 includes a local intrusion detection system (IDS) operable to collect IoT device data about the device operation 208. The supervisory application 212 includes a supervisory intrusion detection system (IDS) 214 and an attack model identifier 216.

In one or more embodiments, the local IDS 204, supervisory application 212, and supervisory IDS 214 can be implemented on the processing system 100 found in FIG. 1. Additionally, a network can be utilized for electronic communication between and among the supervisory application and IoT devices. The network can be in wired or wireless electronic communication with one or all of the elements of the system 200. Cloud computing can supplement, support or replace some or all of the functionality of the elements of the system 200. Additionally, some or all of the functionality of the elements of system 200 can be implemented as a cloud computing node.

As described herein, the IoT device 202 can be any type of appliance, sensor, and the like. The IoT devices 202 can be connected to a network, such as a home network or cloud network as mentioned above. The IoT devices 202 can collect device data 208 during operation of the IoT device. This device data can include operational and non-operational data. Operational data can include information about the IoT device 202 operations such as sensor readings, adjustments made to a system, and the like. For example, for an IoT thermostat, operational data can include temperature readings, humidity readings, adjustments made to the temperature, changes in temperature over time, and any other data associated with the thermostat operation. Non-operational data can include data regarding memory usage, power consumption, CPU usage, network usage, and the like. In the example regarding the thermostat, the thermostat has circuitry within the thermostat to store data, operate the controls for the heating and air conditioning system, and network connectivity data. The local IDS 204 can operate in the IoT device 202 circuitry to analyze the operational and non-operational data. The IoT device 202 can include a security model that includes a statistical model related to device operational and non-operational ranges for the particular IoT device 202. For example, for a thermostat, an operational range can include a range of temperatures measured over time that would indicate a potential intrusion into the IoT device should it be exceeded. A change of one or two degrees may not exceed the operational ranges, but a large change, such as five degree change within an hour might indicate the IoT device 202 has been compromised and a potential intrusion is detected. Non-operation ranges can include ranges of network bandwidth utilized, memory usage ranges, and the like. Any usage that exceeds these ranges can be a potential intrusion.

In one or more embodiments, when a local IDS 204 detects a potential intrusion, the local IDS 204 can send a status update to the supervisory application 212 which can be located on a remote server. The supervisory application 212 can employ a supervisory IDS 214 that can analyze the status alert to determine that a potential intrusion exists on an IoT device 202. Based on this status alert, the supervisory IDS 214 can request additional operational and non-operational data from the IoT device 202 to analyze. The supervisory IDS 214 can utilize an attack model identifier 216 to identify the type of attack (i.e., intrusion) and invoke a security measure to address the attack. The security measure can include a known patch taken from the attack model identifier 216. The security measure can also include a change in the IoT device 202 configuration to account for the intrusion. Also, the security measure can include taking the IoT device 202 offline (i.e., isolating the device from other IoT device) and substituting a virtual representation of the device to ensure proper operation while the device is offline. For example, if the IoT device with an intrusion event is a sensor in a security system. The supervisory IDS 214 can isolate that particular sensor and utilize the remaining sensors to account for the removal of the particular sensor with the intrusion event. The owner of the IoT device 202 can be notified and the IoT device 202 could be replaced or a repair person could be sent to fix or replace the IoT device 202.

In one or more embodiments, the supervisory IDS 214 can develop a security model for each of the IoT devices 202. The security model can be developed based on operational and non-operational data taken from a host of IoT device 202. As potential intrusions are detected, analyzed, and resolved, the security model can be continuously updated for each of the IoT devices 202. For example, the supervisory IDS 214 may define an operational range for a particular IoT device 202. The local IDS 204 will continuously monitor the operational data collected and any data that exceeds the operational range will be reported to the supervisory IDS 214 for review. For example, the security model can be a statistical model developed to determine anomalous behavior at the IoT device level. This statistical model can utilize machine learning techniques to develop correlations between IoT device operations and environmental data. Additionally, the statistical model can be utilized for multiple IoT devices to identify a potential intrusion. Once a potential intrusion is identified, the supervisory IDS 214 is notified. If the potential intrusion does exceed the operational ranges or is determined by the statistical model to be an intrusion, further analysis by the supervisory IDS 214 may conclude that it is not an actual intrusion to the IoT device 202. When this occurs, the operational ranges and the statistical model can be updated to account for these particular anomalous readings so an alert is not triggered for future anomalous readings. The supervisory intrusion detection model not only utilizes correlations between different data vectors but it also computes and uses a number of features (e.g., average temperature over an hour, different between the temperatures of two sensors, etc.) from the operational and non-operational data of IOT devices. When an intrusion is detected it is often because the values of one or more features are out of ranges. These features can then be communicated to an end-user to explain why an alert was generated, and consequently can be updated based on the user feedback.

Traditional machine learning techniques learn a single monolithic mathematical model and fit the parameters of the model that captures the relations between different data vectors, whereas the supervisory detection model composes many relations to build the detection model where each relation is learnt between two or more data vectors associated with the operational or non-operational data of IoT devices. The advantage of this approach is that the model can evolve incrementally over time.

Figure 3:
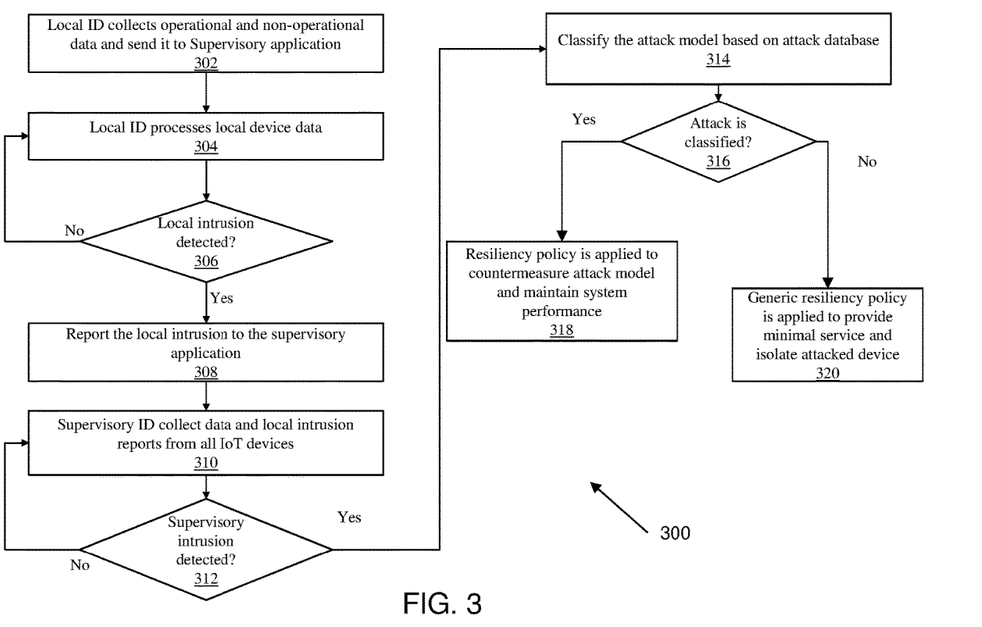
FIG. 3 depicts a flow chart of a method for intrusion detection according to one or more embodiments.

FIG. 3 depicts a flow chart of a method for intrusion detection according to one or more embodiments. The method 300 includes an intrusion detection system collecting operational and non-operational data and forwarding it to the supervisory application, as shown in block 302. As the data is being sent to the supervisory application, the method 300 has the local ID processing the local device data, as shown at 304. The local device data includes the operational and non-operational data. At decision block 306, the method 300 determines if a local intrusion is detected. As mentioned above, the local intrusion (potential intrusion) is identified based on a statistical model (security model) which looks at operational ranges and the like to see if any of the device data include anomalous data. If decision block 306 returns a No, the method 300 proceeds back to block 304 to continue processing the device data. If the decision block 306 returns a Yes, the method proceeds to block 308 and the local intrusion is reported to the supervisory application. The method 300 then has the supervisory ID collect data and local intrusion reports from all IoT device, as shown at block 310. At decision block 312, the method 300 determines if the local intrusion is an actual intrusion event (e.g., supervisory intrusion detected?). If the decision block 312 returns a No, the returns to block 310 and continues to collect data and local intrusion reports from IoT devices. However, if the decision block 312 returns a Yes, the method 300 classifies the attack (e.g., intrusion) utilizing a knowledge base (e.g., attack database). The knowledge base can include known attacks based on devices. The method 300 then determines if the attack can be classified, as shown at decision block 316. An attack can be classified if it is known in the attack database. If the decision block 316 returns a yes, the method 300 then invokes a security measure known as a resiliency policy applied to countermeasure the now classified attack model and maintain the system performance. If the decision block 316 returns a No, the method 300 includes a generic resiliency policy applied to provide minimal service and isolate the attacked device from other IoT devices, as shown at block 320.

Figure 4:
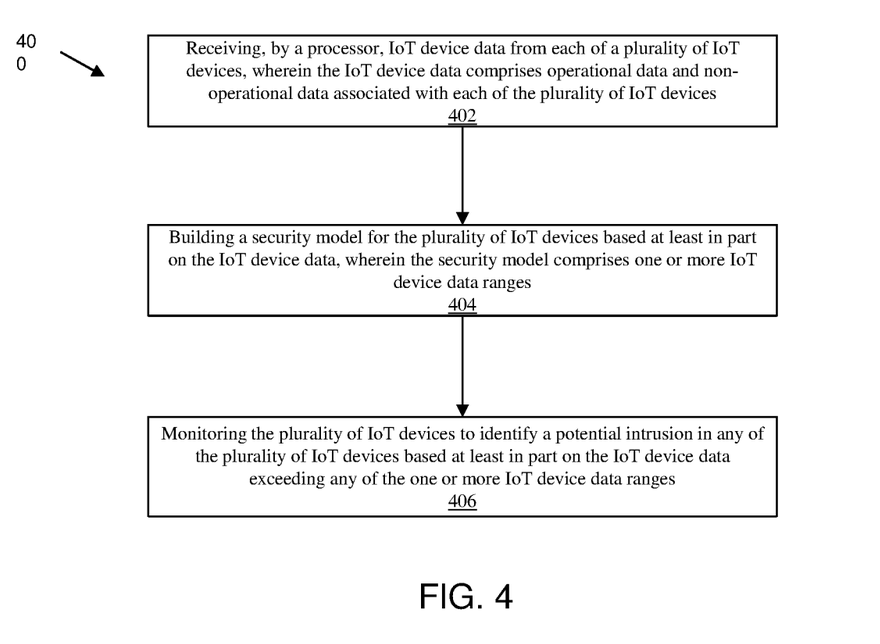
FIG. 4 depicts a flow diagram of a method for intrusion detection according to one or more embodiments.

FIG. 4 depicts a flow chart of a method for intrusion detection according to one or more embodiments. The method 400 includes receiving, by a processor, IoT device data from each of a plurality of IoT devices, wherein the IoT device data comprises operational data and non-operational data associated with each of the plurality of IoT devices, as shown at block 402. The method 400, at block 404, includes building a security model for the plurality of IoT devices based at least in part on the IoT device data, wherein the security model comprises one or more IoT device data ranges. At block 406, the method 400 includes monitoring the plurality of IoT devices to identify a potential intrusion in any of the plurality of IoT devices based at least in part on the IoT device data exceeding any of the one or more IoT device data ranges.

Additional processes may also be included. It should be understood that the processes depicted in FIG. 4 represent illustrations, and that other processes may be added or existing processes may be removed, modified, or rearranged without departing from the scope and spirit of the present disclosure.

A detailed description of one or more embodiments of the disclosed apparatus are presented herein by way of exemplification and not limitation with reference to the Figures.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method for intrusion detection, the method comprising:
   receiving, by a processor, internet of things (IoT) device data from each of a plurality of IoT devices, wherein the IoT device data comprises operational data and non-operational data associated with each of the plurality of IoT devices;
   building a security model for the plurality of IoT devices based at least in part on the IoT device data, wherein the security model comprises one or more IoT device data ranges; and
   monitoring the plurality of IoT devices to identify a potential intrusion in any of the plurality of IoT devices based at least in part on the IoT device data exceeding any of the one or more IoT device data ranges;
   identifying a first device in the plurality of IoT devices where the potential intrusion occurred;
   analyzing one or more characteristics of the potential intrusion to determine that the potential intrusion is an intrusion event;
   analyzing the intrusion event to determine whether the intrusion event is a known event or an unknown event;
   employing, in the first device, a first security measure based on a determination that the intrusion event is a known intrusion event; and
   employing, in the first device, a second security measure based on a determination that the intrusion event is an unknown intrusion event;
   wherein employing one of the first security measure and the second security measure for the intrusion event comprises:
   isolating the first device of the plurality of IoT devices from one or more other IoT devices in the plurality of IoT devices, the first device of the plurality of IoT devices indicating an anomaly; and
   reconfiguring the one or more IoT devices to account for the isolating the first device.

2. The method of claim 1, further comprising:
   updating the security model with the one or more characteristics of the potential intrusion.

3. The method of claim 1, wherein evoking the security measure for the intrusion event comprises triggering a change to a configuration of the first device.

4. The method of claim 1, wherein the device data further comprises status data associated with the plurality of IoT devices; and wherein the monitoring the plurality of IoT devices to identify the potential intrusion comprises:

analyzing the status data for each of the plurality of IoT devices to determine one or more anomalies associated with a first device;

obtaining additional IoT device data associated with the first IoT device; and analyzing the additional IoT device data to determine the potential intrusion.

5. The method of claim 1, wherein the determining that the potential intrusion is an intrusion event further comprises:

comparing the one or more characteristics of the potential intrusion to historical IoT device data associated with the plurality of IoT devices.

6. A system for intrusion detection, the system comprising:

a processor communicatively coupled to a memory, the processor configured to perform a method comprising:

receiving, by the processor, IoT device data from each of a plurality of IoT devices, wherein the IoT device data comprises operational data and non-operational data associated with each of the plurality of IoT devices;

building a security model for the plurality of IoT devices based at least in part on the IoT device data, wherein the security model comprises one or more IoT device data ranges; and monitoring the plurality of IoT devices to identify a potential intrusion in any of the plurality of IoT devices based at least in part on the IoT device data exceeding any of the one or more IoT device data ranges;

identifying a first device in the plurality of IoT devices where the potential intrusion occurred;

analyzing one or more characteristics of the potential intrusion to determine that the potential intrusion is an intrusion event;

analyzing the intrusion event to determine whether the intrusion event is a known event or an unknown event;

employing, in the first device, a first security measure based on a determination that the intrusion event is a known intrusion event; and employing, in the first device, a second security measure based on a determination that the intrusion event is an unknown intrusion event;

wherein employing one of the first security measure and the second security measure for the intrusion event comprises:

isolating the first device of the plurality of IoT devices from one or more other IoT devices in the plurality of IoT devices, the first device of the plurality of IoT devices indicating an anomaly; and reconfiguring the one or more IoT devices to account for the isolating the first device.

7. The system of claim 6, further comprising:

updating the security model with the one or more characteristics of the potential intrusion.

8. The system of claim 6, wherein evoking the security measure for the intrusion event comprises triggering a change to a configuration of the first device.

9. The system of claim 6, wherein the device data further comprises status data associated with the plurality of IoT devices; and wherein the monitoring the plurality of IoT devices to identify the potential intrusion comprises:

analyzing the status data for each of the plurality of IoT devices to determine one or more anomalies associated with a first device;

obtaining additional IoT device data associated with the first device; and analyzing the additional IoT device data to determine the potential intrusion.

10. The system of claim 6, wherein the determining that the potential intrusion is an intrusion event further comprises:

comparing the one or more characteristics of the potential intrusion to historical IoT device data associated with the plurality of IoT devices.

11. A computer program product comprising:

a non-transitory computer readable storage medium having program instructions embodied therewith, the program instructions executable by a processor to cause the processor to perform a method comprising:

receiving, by the processor, IoT device data from each of a plurality of IoT devices, wherein the IoT device data comprises operational data and non-operational data associated with each of the plurality of IoT devices;

building a security model for the plurality of IoT devices based at least in part on the IoT device data, wherein the security model comprises one or more IoT device data ranges; and monitoring the plurality of IoT devices to identify a potential intrusion in any of the plurality of IoT devices based at least in part on the IoT device data exceeding any of the one or more IoT device data ranges;

identifying a first device in the plurality of IoT devices where the potential intrusion occurred;

analyzing one or more characteristics of the potential intrusion to determine that the potential intrusion is an intrusion event;

analyzing the intrusion event to determine whether the intrusion event is a known event or an unknown event;

employing, in the first device, a first security measure based on a determination that the intrusion event is a known intrusion event; and employing, in the first device, a second security measure based on a determination that the intrusion event is an unknown intrusion event;

wherein employing one of the first security measure and the second security measure for the intrusion event comprises:

isolating the first device of the plurality of IoT devices from one or more other IoT devices in the plurality of IoT devices, the first device of the plurality of IoT devices indicating an anomaly; and reconfiguring the one or more IoT devices to account for the isolating the first device.

12. The computer program product of claim 11, further comprising:

updating the security model with the one or more characteristics of the potential intrusion.

13. The computer program product of claim 11, wherein evoking the security measure for the intrusion event comprises triggering a change to a configuration of the first device.

14. The computer program product of claim 11, wherein the device data further comprises status data associated with the plurality of IoT devices; and wherein the monitoring the plurality of IoT devices to identify the potential intrusion comprises:

analyzing the status data for each of the plurality of IoT devices to determine one or more anomalies associated with a first device;

obtaining additional IoT device data associated with the first device; and analyzing the additional IoT device data to determine the potential intrusion.

\* \* \* \* \*